May 23, 1939.  P. F. K. ERBGUTH  2,159,504
DISK CHART HUB
Filed Sept. 18, 1937
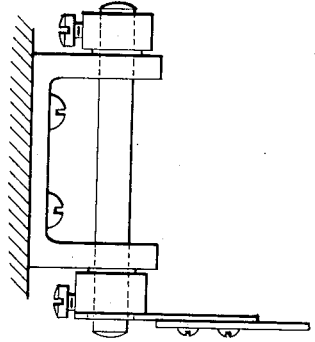
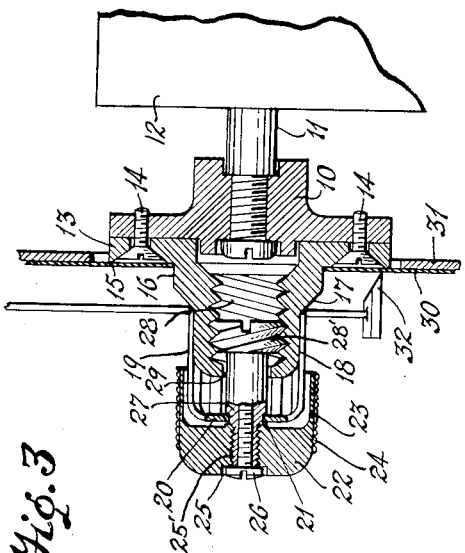
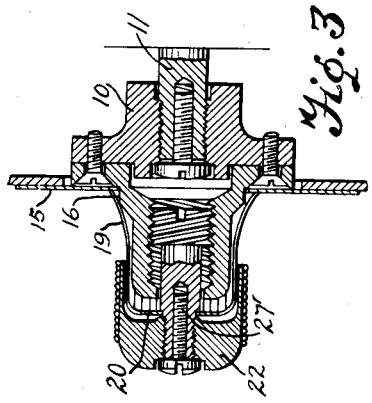
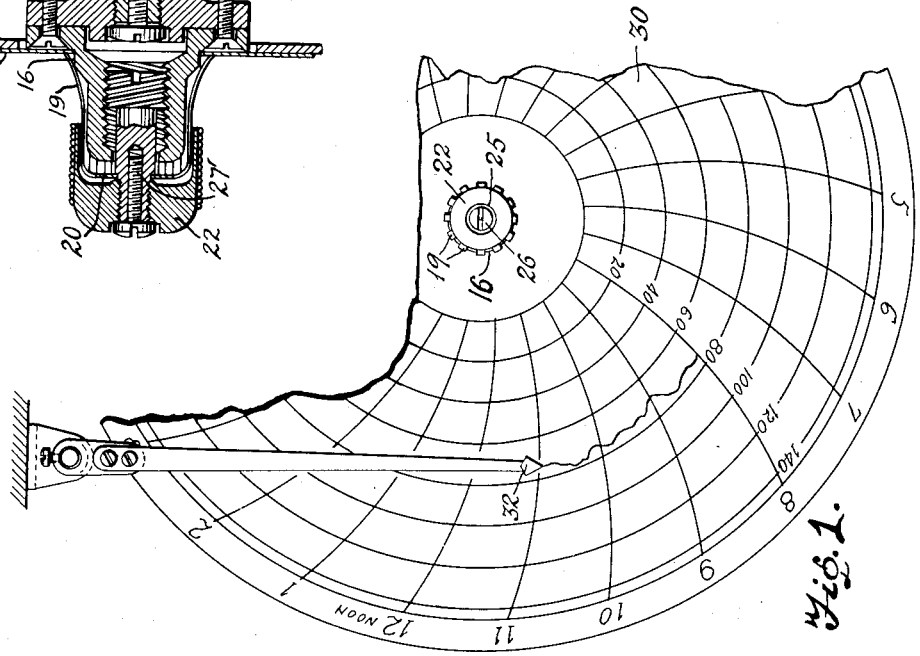
INVENTOR.
Paul F. K. Erbguth
BY
ATTORNEYS.
WITNESS
Ed S. Smith, Jr.

Patented May 23, 1939

2,159,504

UNITED STATES PATENT OFFICE 2,159,504

DISK CHART HUB

Paul F. K. Erbguth, Brooklyn, N. Y., assignor to Charles J. Tagliabue Mfg. Co., Brooklyn, N. Y., a corporation of New York Application September 18, 1937, Serial No. 164,445

6 Claims. (Cl. 234—75)

The present invention relates to a hub and cap therefor for frictionally securing a disk chart thereto so as to be driven by a time shaft. It particularly relates to the type of hub having a non-removable cap for securing the chart.

A primary object of the invention is to provide an improved hub including a chart-securing cap as an element thereof, so that a disk chart, having a conventional circular central aperture, may be placed directly over the cap onto the hub and then secured by the manual turning, preferably a single twist, of the cap.

A related object is to provide a non-removable cap, all parts of which are of smaller diameter than that of the hole in the chart when the cap is in a non-securing position, and having a portion larger than the chart hole when in its chart securing or gripping position. A further object of the invention is to provide a chart hub, of the class described, in which the chart-securing means progressively increases in diametric size toward that of the hole as the chart-abutting surface of the hub is approached.

Still another object of the present invention is to provide such a hub with a plurality of flexible spring fingers for adjustably securing the chart to a time-driven hub in the proper time relation and so that the chart may be readily attached and removed. A still further object of the present invention is to so arrange such flexible chart-engaging fingers that they move only nearly axially when their cap is manually rotated, a feature of importance in that it permits the rapid one-handed removal and attaching of charts in their proper time relation. In many process industries, large numbers of such charts must be changed daily so that the present invention permits the saving of considerable time of employees and even a reduction in the number of employees required for obtaining the records necessary for the successful and economic operation of such processes. Still another object of the present invention is the provision of a compact and inexpensive non-removable chart-securing device which is attractive in appearance and extremely convenient in use by even an unskilled operator.

These and other objects of my invention will appear to those skilled in the art from the accompanying drawing and specification, in which are illustrated and described two specific embodiments of the invention. It is my intention to claim all that I have disclosed which is new and useful.

In the drawing, wherein like characters indicate like parts throughout: Fig. 1 is a front elevation of my device shown installed in a conventional recording instrument, only part of which is shown, and Fig. 2 is a broken and partial side elevation thereof, such section being taken on the line 2—2 of Fig. 1, the scale of Fig. 2 being twice that of Fig. 1. Fig. 3 shows the hub in the chart-engaging position of Fig. 1, and is generally similar to Fig. 2 which shows the hub in its retracted position. It will be understood that the chart hub 10 is driven by a clock motor to rotate a disk chart relative to a marking pen therefor, all in conventional manner, and that the specific form shown is simply for illustrative and descriptive purposes and without attempt to restrict the field of applicability of the invention.

Referring to the drawing, the chart hub comprises a base portion 10, secured by screw threads and by a locking screw to shaft 11 driven at constant speed by clock motor 12 to rotate, for example, once every twenty-four hours. To hub base 10, chart-mounting element 13 is secured by two counter-sunk screws 14 which have their heads sunk slightly below the chart-abutting surface 15 of hub element 13 which also has a concentric chart-guiding cylindrical portion 16 coaxial with the axis of rotation of shaft 11, surface 15 being normal both to such axis and to intersecting surface 16. Surface 16 is a relatively short cylinder, i. e., having a length of the order of only ten times the thickness of the chart, its outer edge being formed by intersection with frusto-conical surface 17, also coaxial with time shaft 11, the outer edge of this frusto-conical surface being formed by intersecting a similarly coaxial cylindrical surface 18. When unstressed, a plurality of flexible fingers 19 are spaced to form a cylinder of slightly greater inside diameter than the diameter of surface 18 and smaller than the diameter of cylindrical surface 16. These fingers 19 are joined at their roots in a disc 20 having a circular hole 21 therein. Cap 22 has a cylindrical portion 23 which has an outside diameter appreciably smaller than that of the chart hole and an inside diameter slightly greater than the outside diameter of the adjacent portion of fingers 19 even when these are most widely spread. Cap 22 also has a disk-like portion 24, knurled on its circumferential surface and containing hole 25, concentric with the axis of rotation of time shaft 11. The head of lock-screw 26 abuts the end of cap 22 and this screw passes through hole 25 of knurled cap 22 to be threaded into member 27. Member 27 also has a shoulder adjoining threads 26' on its exterior, which threads 25' are screwed into mating threads in the interior of hole 25. Flexible finger member 19, 20 is rotatably secured in a groove between adjacent shoulders of members 22 and 27, there being appreciable clearance on the sides of disk 20 and also in its hole 21. From Fig. 2, member 27 is seen to have three screw portions: (1) a female thread 27' for lock-screw 26, (2) a male thread 25' for attaching member 27 to cap 22, and (3) a male thread 28' on a head-portion of still larger diameter adapted to engage a female double-pitch thread portion 28 of hub element 13. A screw head slot, provided on the inside end of member 27, is accessible for purposes of assembly when hub parts 19 and 13 are separated. The external end of member 13 is flanged inwardly to form a hole 29 through which passes a neck portion of member 27 which is of slightly smaller diameter than that of hole 29 of member 13, which hole is slightly smaller in diameter than that of the double-pitch threaded head portion of member 27, the arrangement being such that member 27 is non-removable from member 13 without disassembling the device. The central hole of chart 30 has a diameter equal to or, preferably, very slightly smaller than that of the guiding portion 16 of element 13. The inner ends of flexible fingers 19 frictionally engage the outer surface of chart 30 when cap 22 is twisted, due to the axial movement resulting from the helical movement of the mating threads on members 13 and 27. The rear surface of chart 30 is guided by the planar front surface of chart plate 31, which last-named surface is practically in the same plane as that of chart-abutting surface 15 of the hub. Marking pen 32, biased inwardly towards chart 30 and its plate 31, is positionable relative to the axis of rotation of the hub. In Fig. 1 these flexible fingers 19 are shown in chart-engaging relation, while in Fig. 2, fingers 19 are shown in their retracted position for the changing of charts.

The operation of my device is as follows: Assuming that a record has been completed on one chart 30 and it is desired to replace this chart by another, the operator twists the knurled portion of cap 22 between a thumb and forefinger to unscrew the attached male threaded portion of member 27 along the female thread 28 until the outer end of such threaded portion of the member 27 abuts the inner face of the flange 29, at which time flexible fingers 19 have been retracted from engagement with chart 30 along hub surfaces 16 and 17 and over hub surface 18, springing axially outwardly with a snap as the ends of fingers 19 clear the outer end of cylinder 16 and slide on the conical surface 17. The "used" chart is then removed, the edges of its circular hole readily clearing all portions of retracted fingers 19 and of knurled cap 22. A new chart 30 is likewise readily slipped into place over cap 22 and over the retracted fingers 19, the edges of the chart hole passing smoothly over the frusto-conical hub portion into guiding engagement with cylindrical surface 16, after which a twist of cap 22 causes the ends of flexible fingers 19 to slide axially over surface 16 into abutting frictional engagement with the front surface of chart 30 as shown in Fig. 3. Chart 30 may be readily adjusted to the desired time relation with its marking pen 32, which relation is undisturbed by the subsequent twisting of cap 22 in securing the chart, since the flexible fingers 19 move nearly axially when near the chart, which nearly axial, rather than helical movement, upon the turning of the threaded member, is due to the small friction and diameter of hole 21 relative to those of the chart guiding portion 16 of the hub. This non-disturbance of a setting when tightening the cap is a great advantage in practice and a novel and highly useful feature of the present invention. Incidentally, while changing charts, it is customary to retract pen 32 from the surface of chart 30.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a mechanism for recording the value of a variable upon a disk chart having a central hole therein, the combination of a rotatable shaft; a hub assembly affixed to said shaft and having a planar chart-abutting outer portion normal to its axis, an adjacent coaxial cylindrical chart-guiding outer portion intersecting a coaxial frusto-conical outer portion, and having a female threaded inner portion ending externally in a shoulder forming a hole smaller than the diameter of the threaded portion; a cap assembly having an internally-disposed male threaded portion operatively engaging said female threaded hub portion, an external manipulatable body portion, and an intermediate connecting neck portion of smaller diameter than that of the hole in the hub, said neck portion having a coaxial groove therein; and chart-engaging means having a coaxial disc with a central hole disposed as a collar for said groove, and rotatably mounted on said neck portion, and a plurality of flexible fingers joining the periphery of the disc and forming, when their ends are at the small end of the frusto-conical hub portion, a normally unstressed slotted coaxial cylinder which in another position is stressed by contact with the cylindrical, and its adjacent frusto-conical, chart-guiding hub portion all adapted and arranged to cause the fingers to move nearly axially when adjacent their chart-engaging position.

2. In combination, a chart hub formed of two portions, one of which is adapted to be attached to a rotatable shaft and the other of which is internally threaded, secured to the first-mentioned portion, and has a reduced diameter hole-forming flange at the outer end of its threaded portion; a cap assembly having a male threaded portion on its internal end, a reduced diameter cylindrical neck smaller than the hole in said hub flange, and an external manipulatable body; and a multiplicity of flexible finger means rotatably connected with the neck of said cap assembly.

3. For use in a chart recorder including a shaft for moving a chart having a hole therein, the combination of a hub assembly attachable to the shaft and having inner and intermediate portions respectively for axially and rotationally restraining the chart and an outwardly tapering portion adjacent the lastnamed portion; a cap assembly non-removably threaded on the outer end of said hub assembly; and chart-engaging means rotatably mounted on said cap assembly with perceptible play axially and having a chart-engaging portion; said tapered hub-portion and said chart-engaging means portion being adapted and arranged to slidingly coact to cause said means to snap outwardly perceptibly when said means portion is retracted from said intermediate hub-portion onto said tapered hub-portion.

4. In a chart recorder including a shaft for moving a chart having a hole therein, the combination of a hub assembly adapted to be attached to the shaft and having a chart-abutting surface larger than the chart hole and an adjacent chart-guiding shoulder of substantially the same size as that of the chart hole; a cap assembly threaded axially on said hub assembly and small enough to clear the chart hole when the chart is being changed; and retractable and expansible chart-engaging means rotatably mounted on said cap assembly, small enough when in a retracted position to clear the chart hole during the changing of the chart and large enough so that a chart-engaging portion is expansible to overlap said shoulder when said means is in a chart-engaging position; said hub assembly being provided with such a steeply-tapering portion adjacent said shoulder that the coacting chart-engaging portion of said means moves less radially, upon turning the cap assembly upon the hub assembly, when overlapping said shoulder and adjacent a chart-securing position than when engaging said tapering portion.

5. In a chart recorder including a shaft for moving a chart having a hole therein, the combination of a hub assembly adapted to be attached to the shaft and having a chart-abutting surface larger than the chart hole and an adjacent chart-guiding shoulder of substantially the same size as that of the chart hole; a cap assembly threaded axially on said hub assembly and small enough to clear the chart hole when the chart is being changed; and retractable and expansible chart-engaging means rotatably mounted an said cap assembly, small enough when in a retracted position to clear the chart hole during the changing of the chart and large enough so that a chart-engaging portion is expansible to overlap said shoulder when said means is in a chart-engaging position; said hub assembly being provided with a tapering portion adjacent said shoulder and said chart-engaging means portion comprising a plurality of flexible fingers which are less stressed when in a retracted position than when sprung outwardly by the tapering portion to frictionally engage the shoulder when adjacent the chart-engaging position, whereby the chart-engaging means moves non-rotatably and nearly axially when adjacent its chart-engaging position.

6. In a chart recorder including a shaft for moving a chart having a hole therein, the combination of a hub assembly attachable to the shaft and having a portion for axially guiding the chart to an operative position, a cap threaded on the outer end of said hub assembly, and chart-engaging means rotatably mounted on said cap and having chart-engaging portions, the chart-engaging portions and said hub assembly adjacent to the guiding portion being so configurated that the chart engaging portions on the chart-engaging means will move substantially axially when approaching engagement with the chart when the cap is threaded downwardly on the hub assembly.

PAUL F. K. ERBGUTH.